US012331932B2

(12) United States Patent
Chiranthan et al.

(10) Patent No.: US 12,331,932 B2
(45) Date of Patent: Jun. 17, 2025

(54) TURBINE ENGINE FUEL MIXER

(71) Applicant: GENERAL ELECTRIC COMPANY, Schenectady, NY (US)

(72) Inventors: R Narasimha Chiranthan, Bengaluru (IN); Manampathy G. Giridharan, Evendale, OH (US); Ajoy Patra, Bengaluru (IN); Pradeep Naik, Bengaluru (IN); Perumallu Vukanti, Bengaluru (IN); Michael T. Bucaro, Arvada, CO (US); Hiranya Kumar Nath, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/717,603

(22) Filed: Apr. 11, 2022

(65) Prior Publication Data

US 2023/0243502 A1     Aug. 3, 2023

(30) Foreign Application Priority Data

Jan. 31, 2022   (IN) .............................. 202211005165

(51) Int. Cl.
*F23R 3/28*     (2006.01)
*F02C 7/22*     (2006.01)
(52) U.S. Cl.
CPC ................ *F23R 3/286* (2013.01); *F02C 7/22* (2013.01)
(58) Field of Classification Search
CPC .................................... F23R 3/286; F02C 7/22
See application file for complete search history.

(56) References Cited

U.S. PATENT DOCUMENTS

| 2,565,843 | A | 8/1951 | Dennison |
| 2,616,258 | A | 11/1952 | Mock |
| 3,917,173 | A | 11/1975 | Singh |
| 3,946,552 | A | 3/1976 | Weinstein et al. |
| 3,972,182 | A | 8/1976 | Salvi |
| 3,980,233 | A | 9/1976 | Simmons et al. |
| 4,100,733 | A | 7/1978 | Striebel et al. |

(Continued)

FOREIGN PATENT DOCUMENTS

| CN | 1222660 A | 7/1999 |
| CN | 101184912 A | 5/2008 |

(Continued)

OTHER PUBLICATIONS

T.S. Snyder et al., "Emission and Performance of a Lean-Premixed Gas Fuel Injection System for Aeroderivative Gas Turbine Engines", Journal of Engineering for Gas Turbines and Power, ASME Digital Collection, vol. 118, Issue 1, pp. 38-45, Jan. 1, 1996.

(Continued)

*Primary Examiner* — Arun Goyal
(74) *Attorney, Agent, or Firm* — Carter, DeLuca & Farrell LLP; George Likourezos; Jason B. Scher

(57) ABSTRACT

A turbine engine can include a compressor section, a combustion section, and a turbine section in serial flow arrangement. The combustion section can include a combustor with a fuel mixer. The fuel mixer can include an outer wall defining a longitudinal direction and having a mixture outlet, a first compressed air flow passage, and a second compressed air flow passage.

18 Claims, 12 Drawing Sheets

(56) References Cited

U.S. PATENT DOCUMENTS

| | | |
|---|---|---|
| 4,177,637 A | 12/1979 | Pask |
| 4,215,535 A | 8/1980 | Lewis |
| 4,222,232 A | 9/1980 | Robinson |
| 4,226,083 A | 10/1980 | Lewis et al. |
| 4,262,482 A | 4/1981 | Roffe et al. |
| 4,408,461 A | 10/1983 | Bruhwiler et al. |
| 4,412,414 A | 11/1983 | Novick et al. |
| 4,689,961 A | 9/1987 | Stratton |
| 4,763,481 A | 8/1988 | Cannon |
| 4,967,561 A | 11/1990 | Bruhwiler et al. |
| 5,121,597 A | 6/1992 | Urushidani et al. |
| 5,207,064 A | 5/1993 | Ciokajlo et al. |
| 5,211,675 A | 5/1993 | Bardey et al. |
| 5,235,817 A | 8/1993 | Leonard |
| 5,251,447 A | 10/1993 | Joshi et al. |
| 5,263,325 A | 11/1993 | McVey et al. |
| 5,265,409 A | 11/1993 | Smith, Jr. et al. |
| 5,307,634 A | 5/1994 | Hu |
| 5,339,635 A | 8/1994 | Iwai et al. |
| 5,351,477 A | 10/1994 | Joshi et al. |
| 5,373,693 A | 12/1994 | Zarzalis et al. |
| 5,408,830 A | 4/1995 | Lovett |
| 5,511,375 A | 4/1996 | Joshi et al. |
| 5,592,821 A | 1/1997 | Alary et al. |
| 5,619,855 A | 4/1997 | Burrus |
| 5,622,054 A | 4/1997 | Tingle |
| 5,675,971 A | 10/1997 | Angel |
| 5,791,137 A | 8/1998 | Evans et al. |
| 5,816,049 A | 10/1998 | Joshi |
| 5,829,967 A | 11/1998 | Chyou |
| 5,839,283 A | 11/1998 | Dobbeling |
| 5,862,668 A | 1/1999 | Richardson |
| 5,881,756 A | 3/1999 | Abbasi et al. |
| 5,937,653 A | 8/1999 | Alary et al. |
| 5,987,889 A | 11/1999 | Graves |
| 6,016,658 A | 1/2000 | Willis et al. |
| 6,038,861 A | 3/2000 | Amos et al. |
| 6,158,223 A | 12/2000 | Mandai et al. |
| 6,272,840 B1 | 8/2001 | Crocker et al. |
| 6,286,298 B1 | 9/2001 | Burrus et al. |
| 6,295,801 B1 | 10/2001 | Burrus et al. |
| 6,331,109 B1 | 12/2001 | Paikert et al. |
| 6,367,262 B1 | 4/2002 | Mongia et al. |
| 6,442,939 B1 | 9/2002 | Stuttaford et al. |
| 6,460,339 B2 | 10/2002 | Nishida et al. |
| 6,539,721 B2 | 4/2003 | Oikawa et al. |
| 6,539,724 B2 | 4/2003 | Cornwell et al. |
| 6,543,235 B1 | 4/2003 | Crocker et al. |
| 6,564,555 B2 | 5/2003 | Rice et al. |
| 6,594,999 B2 | 7/2003 | Mandai et al. |
| 6,598,584 B2 | 7/2003 | Beck et al. |
| 6,609,376 B2 | 12/2003 | Bruck et al. |
| 6,742,338 B2 | 6/2004 | Tanaka et al. |
| 6,772,594 B2 | 8/2004 | Nishida et al. |
| 6,837,050 B2 | 1/2005 | Mandai et al. |
| 6,837,051 B2 | 1/2005 | Mandai et al. |
| 6,915,637 B2 | 7/2005 | Nishida et al. |
| 6,920,758 B2 * | 7/2005 | Matsuyama ......... F23M 20/005 60/725 |
| 6,962,055 B2 | 11/2005 | Chen et al. |
| 7,017,329 B2 | 3/2006 | Farhangi et al. |
| 7,036,482 B2 | 5/2006 | Beck et al. |
| 7,117,677 B2 | 10/2006 | Inoue et al. |
| 7,188,476 B2 | 3/2007 | Inoue et al. |
| 7,200,998 B2 | 4/2007 | Inoue et al. |
| 7,284,378 B2 | 10/2007 | Amond, III et al. |
| 7,313,919 B2 | 1/2008 | Inoue et al. |
| 7,343,745 B2 | 3/2008 | Inoue et al. |
| 7,360,363 B2 | 4/2008 | Mandai et al. |
| 7,434,401 B2 * | 10/2008 | Hayashi .................. F23R 3/286 60/743 |
| 7,469,544 B2 | 12/2008 | Farhangi |
| 7,516,607 B2 | 4/2009 | Farhangi et al. |
| 7,565,803 B2 | 7/2009 | Li et al. |
| 7,610,759 B2 | 11/2009 | Yoshida et al. |
| 7,677,026 B2 | 3/2010 | Conete et al. |
| 7,762,074 B2 | 7/2010 | Bland et al. |
| 7,770,397 B2 | 8/2010 | Patel et al. |
| 7,788,929 B2 | 9/2010 | Biebel et al. |
| 7,810,333 B2 | 10/2010 | Kraimer et al. |
| 7,841,180 B2 | 11/2010 | Kraemer et al. |
| 7,871,262 B2 | 1/2011 | Carroni et al. |
| 7,966,801 B2 | 6/2011 | Umeh et al. |
| 8,033,112 B2 | 10/2011 | Milosavljevic et al. |
| 8,033,821 B2 | 10/2011 | Eroglu |
| 8,057,224 B2 | 11/2011 | Knoepfel |
| 8,128,007 B2 | 3/2012 | Thomson |
| 8,161,751 B2 | 4/2012 | Hall |
| 8,225,591 B2 | 7/2012 | Johnson et al. |
| 8,225,613 B2 | 7/2012 | Sisco et al. |
| 8,234,871 B2 | 8/2012 | Davis, Jr. et al. |
| 8,266,911 B2 | 9/2012 | Evulet |
| 8,276,385 B2 | 10/2012 | Zuo et al. |
| 8,316,644 B2 | 11/2012 | Wilbraham |
| 8,322,143 B2 | 12/2012 | Uhm et al. |
| 8,424,311 B2 | 4/2013 | York et al. |
| 8,511,087 B2 | 8/2013 | Fox et al. |
| 8,528,337 B2 | 9/2013 | Berry et al. |
| 8,539,773 B2 | 9/2013 | Ziminsky et al. |
| 8,590,311 B2 | 11/2013 | Parsania et al. |
| 8,621,870 B2 | 1/2014 | Carroni et al. |
| 8,671,691 B2 | 3/2014 | Boardman et al. |
| 8,701,417 B2 | 4/2014 | Nicholls et al. |
| 8,863,524 B2 | 10/2014 | Karlsson et al. |
| 8,938,971 B2 | 1/2015 | Payyapakkam et al. |
| 8,943,835 B2 | 2/2015 | Corsmeier et al. |
| 9,091,444 B2 | 7/2015 | Turrini et al. |
| 9,335,050 B2 | 5/2016 | Cunha et al. |
| 9,377,192 B2 | 6/2016 | Hirata et al. |
| 9,388,985 B2 | 7/2016 | Wu et al. |
| 9,416,973 B2 | 8/2016 | Melton et al. |
| 9,423,137 B2 | 8/2016 | Nickolaus |
| 10,101,025 B2 | 10/2018 | Berhaut et al. |
| 10,190,774 B2 | 1/2019 | Mook et al. |
| 10,865,989 B2 | 12/2020 | Sadasivuni |
| 2003/0101729 A1 | 6/2003 | Srinivasan |
| 2006/0035188 A1 * | 2/2006 | Berenbrink ............. F23R 3/343 431/9 |
| 2010/0101229 A1 | 4/2010 | York |
| 2011/0016871 A1 | 1/2011 | Kraemer et al. |
| 2011/0083439 A1 | 4/2011 | Zuo et al. |
| 2011/0088401 A1 * | 4/2011 | Mancini .................... F23R 3/14 60/737 |
| 2011/0252803 A1 | 10/2011 | Subramaniam et al. |
| 2012/0096866 A1 | 4/2012 | Khan et al. |
| 2012/0131923 A1 | 5/2012 | Elkady et al. |
| 2012/0144832 A1 * | 6/2012 | Herbon .................... F02C 3/14 60/737 |
| 2012/0186256 A1 | 7/2012 | Dai |
| 2012/0285173 A1 | 11/2012 | Poyyapakkam et al. |
| 2012/0305673 A1 | 12/2012 | Matsuyama et al. |
| 2012/0308947 A1 | 12/2012 | Melton et al. |
| 2013/0042625 A1 | 2/2013 | Barker et al. |
| 2013/0199188 A1 | 8/2013 | Boardma et al. |
| 2013/0239581 A1 | 9/2013 | Johnson et al. |
| 2013/0327011 A1 | 12/2013 | Overby et al. |
| 2013/0336759 A1 | 12/2013 | Christians |
| 2014/0060060 A1 | 3/2014 | Bemnero et al. |
| 2014/0165578 A1 | 6/2014 | Burd |
| 2014/0182294 A1 | 7/2014 | Matsumoto et al. |
| 2014/0290258 A1 | 10/2014 | Gerendas et al. |
| 2015/0076251 A1 | 3/2015 | Berry |
| 2015/0082797 A1 | 3/2015 | Matsuyama |
| 2015/0128607 A1 | 5/2015 | Lee |
| 2015/0159874 A1 * | 6/2015 | Toon ..................... F23R 3/283 60/737 |
| 2015/0159875 A1 | 6/2015 | Berry et al. |
| 2016/0010856 A1 | 1/2016 | Biagioli et al. |
| 2016/0033132 A1 * | 2/2016 | Venkatesan ............ F23R 3/286 60/737 |
| 2016/0169110 A1 | 6/2016 | Myers et al. |
| 2016/0209036 A1 | 7/2016 | Cheung |
| 2017/0089582 A1 * | 3/2017 | Carrotte ................... F23R 3/16 |
| 2019/0024899 A1 * | 1/2019 | Patel ..................... F23R 3/346 |

(56) References Cited

U.S. PATENT DOCUMENTS

| | | |
|---|---|---|
| 2019/0093895 A1 | 3/2019 | Lind |
| 2022/0196242 A1* | 6/2022 | Shin ................... F23R 3/286 |
| 2022/0268213 A1* | 8/2022 | Morenko ................ F23R 3/12 |

FOREIGN PATENT DOCUMENTS

| | | |
|---|---|---|
| CN | 101725984 A | 6/2010 |
| CN | 101943060 A | 1/2011 |
| CN | 102235244 A | 11/2011 |
| CN | 202852884 U | 4/2013 |
| CN | 103119370 A | 5/2013 |
| CN | 103438480 A | 12/2013 |
| CN | 104870895 A | 8/2015 |
| CN | 204987087 U | 1/2016 |
| CN | 205090421 U | 3/2016 |
| CN | 205481129 U | 8/2016 |
| DE | 102011054667 A1 | 4/2012 |
| EP | 1319896 A1 | 6/2003 |
| EP | 1336800 A1 | 8/2003 |
| EP | 1736707 A1 | 1/2018 |
| EP | 4271939 A1 | 11/2023 |
| GB | 2462905 A1 | 3/2010 |
| GB | 2585025 A | 12/2020 |
| JP | H10-196957 A | 7/1998 |
| JP | 2014088874 A | 5/2014 |
| WO | 2011031280 A1 | 3/2011 |
| WO | 2011086336 A1 | 7/2011 |

OTHER PUBLICATIONS

Srinivasan et al. "Improving low load combustion, stability, and emissions in pilot-ignited natural gas engines", Journal of Automobile Engineering, Sage journals, Vole 220, No. 2, pp. 229-239, Feb. 1, 2006.

* cited by examiner

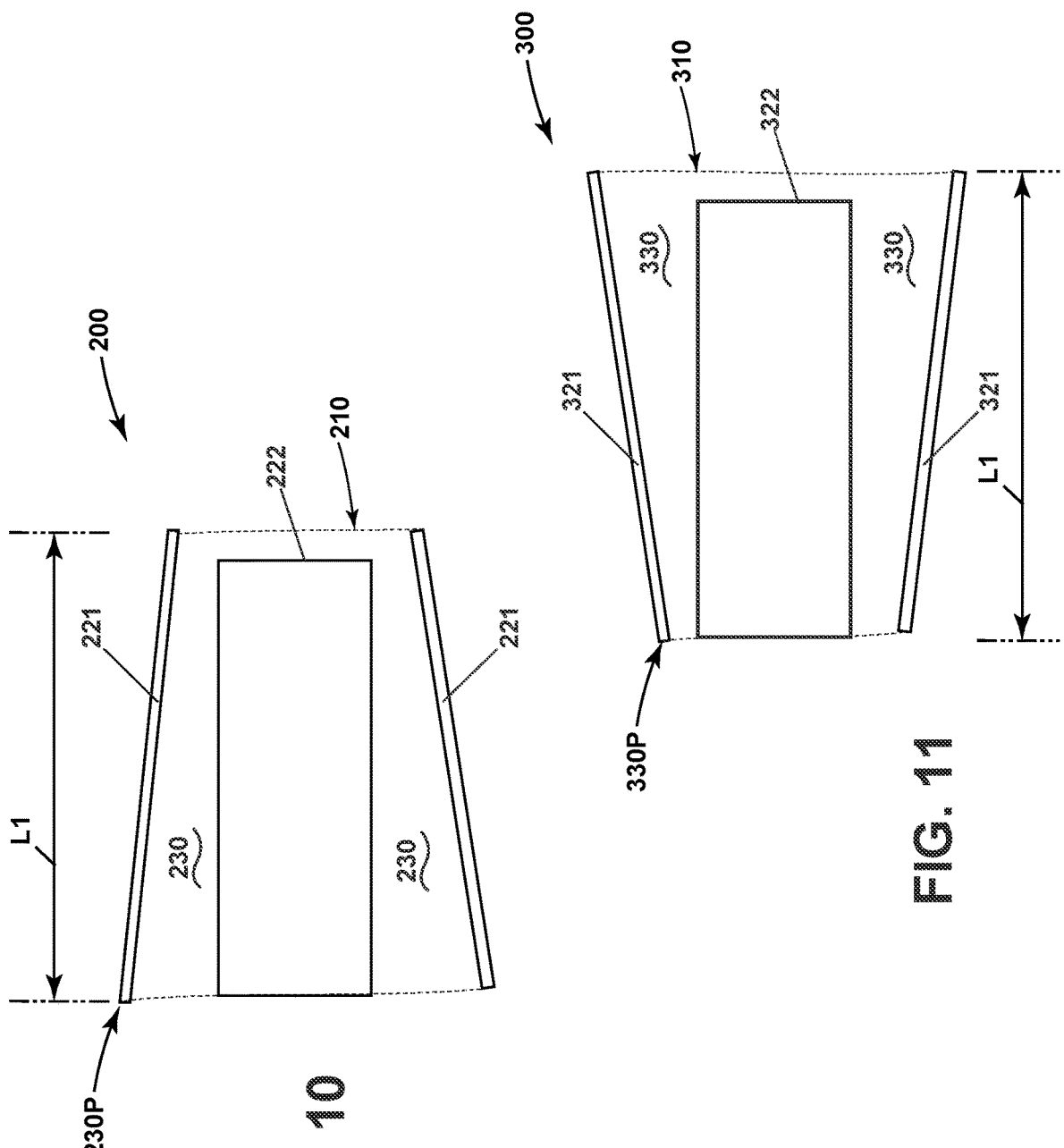

TURBINE ENGINE FUEL MIXER

CROSS-REFERENCE TO RELATED APPLICATION(S)

This application claims priority to Indian Patent Application No. 202211005165, filed Jan. 31, 2022, which is incorporated herein by reference in its entirety.

FIELD

The present subject matter relates generally to a gas turbine engine combustor, and more specifically to a fuel mixer in a turbine engine.

BACKGROUND

A gas turbine engine includes a turbine that is driven by combustion of a combustible fuel within a combustor of the engine. A turbine engine utilizes a fuel nozzle assembly to inject the combustible fuel into the combustor. The fuel nozzle assembly can mix the fuel with air prior to injection in order to achieve efficient combustion.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 10 is a schematic diagram of the second fuel nozzle assembly of FIG. 4 illustrating a common flow passage in a converging configuration.

FIG. 11 is a schematic diagram of the third fuel nozzle assembly of FIG. 4 illustrating another common flow passage in a diverging configuration.

DETAILED DESCRIPTION

Figure 1:
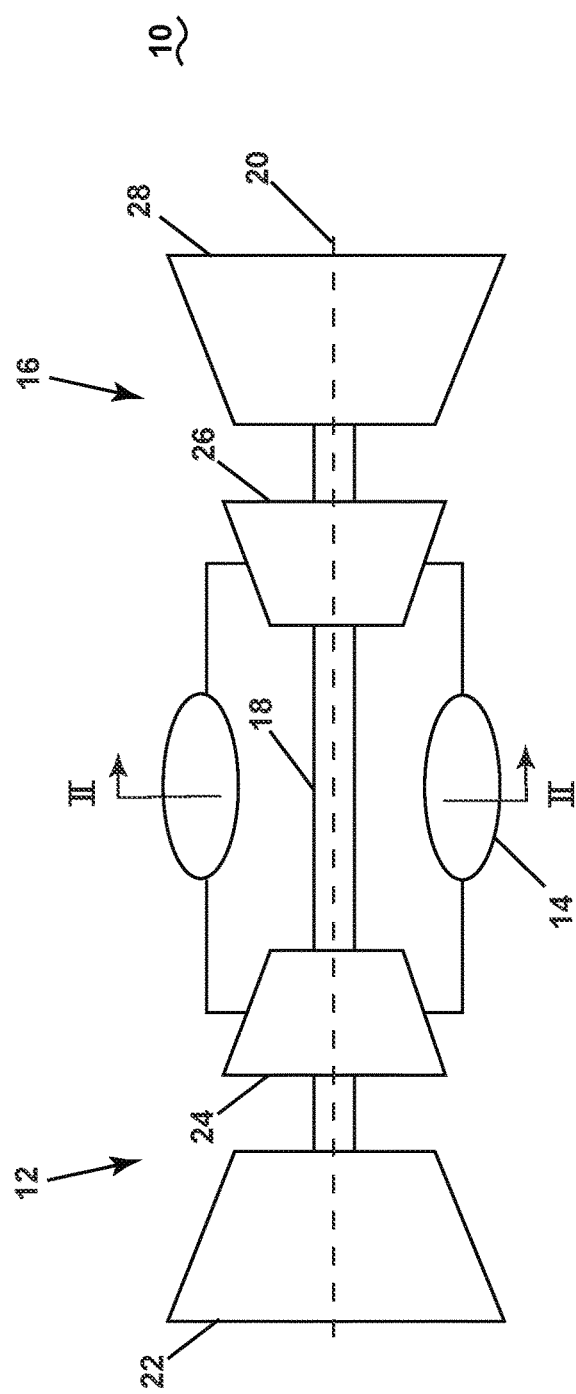
FIG. 1 is a schematic view of a turbine engine having a compression section, a combustion section, and a turbine section in accordance with various aspects described herein.

Aspects of the disclosure herein are directed to a fuel nozzle located within an engine component, and more specifically to a fuel nozzle structure configured for use with heightened combustion engine temperatures, such as those utilizing a hydrogen fuel, or more specifically to a fuel nozzle structure configured for use with the heightened combustion engine temperatures, such as those utilizing a hydrogen fuel. Hydrogen fuels can eliminate carbon emissions, but generate challenges relating to flame holding due to the higher flame speed. Current combustors include a durability risk when using such fuels or other high-temperature fuels due to flame holding on combustor components resultant of flashback. For purposes of illustration, the present disclosure will be described with respect to a turbine engine for an aircraft with a combustor driving the turbine. It will be understood, however, that aspects of the disclosure herein are not so limited and may have general applicability within an engine, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

Reference will now be made in detail to the combustor architecture, and in particular the fuel nozzle for providing fuel to the combustor located within a turbine engine, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Substantially annular" with respect to a duct or flow path, such as a duct or flow path with a heat exchanger positioned therein, refers to a duct or flow path that is fully annular (i.e., extends continuously and uninterrupted in a circumferential direction with the exception of only the heat exchanger), or partially annular with at least 50% volume percent of void with the exception of the heat exchanger (such as at least 60%, such as at least 70%, such as at least 80%, such as at least 90% volume percent of void with the exception of the heat exchanger).

In certain exemplary embodiments of the present disclosure, a turbine engine defining a centerline and a circumferential direction is provided. The gas turbine engine may generally include a turbomachine and a rotor assembly. The rotor assembly may be driven by the turbomachine. The turbomachine, the rotor assembly, or both may define a substantially annular flow path relative to the centerline of the gas turbine engine. The turbine engine includes a combustor positioned upstream of the turbine configured to drive the turbine.

The combustor introduces fuel that has been premixed with air, from a fuel nozzle, and then combusted within the combustor to drive the turbine. Increases in efficiency and reduction in emissions have driven the need to use fuel that burns cleaner or at higher temperatures, such as utilizing hydrogen fuel. There is a need to improve durability of the combustor under these operating parameters, such as improved flame control to prevent flame holding on the fuel nozzle and swirler components. The inventors' practice has proceeded in the manner of designing a fuel nozzle and swirler to meet durability requirements for increased engine temperatures and hydrogen fuel.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor section 12 and turbine section 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
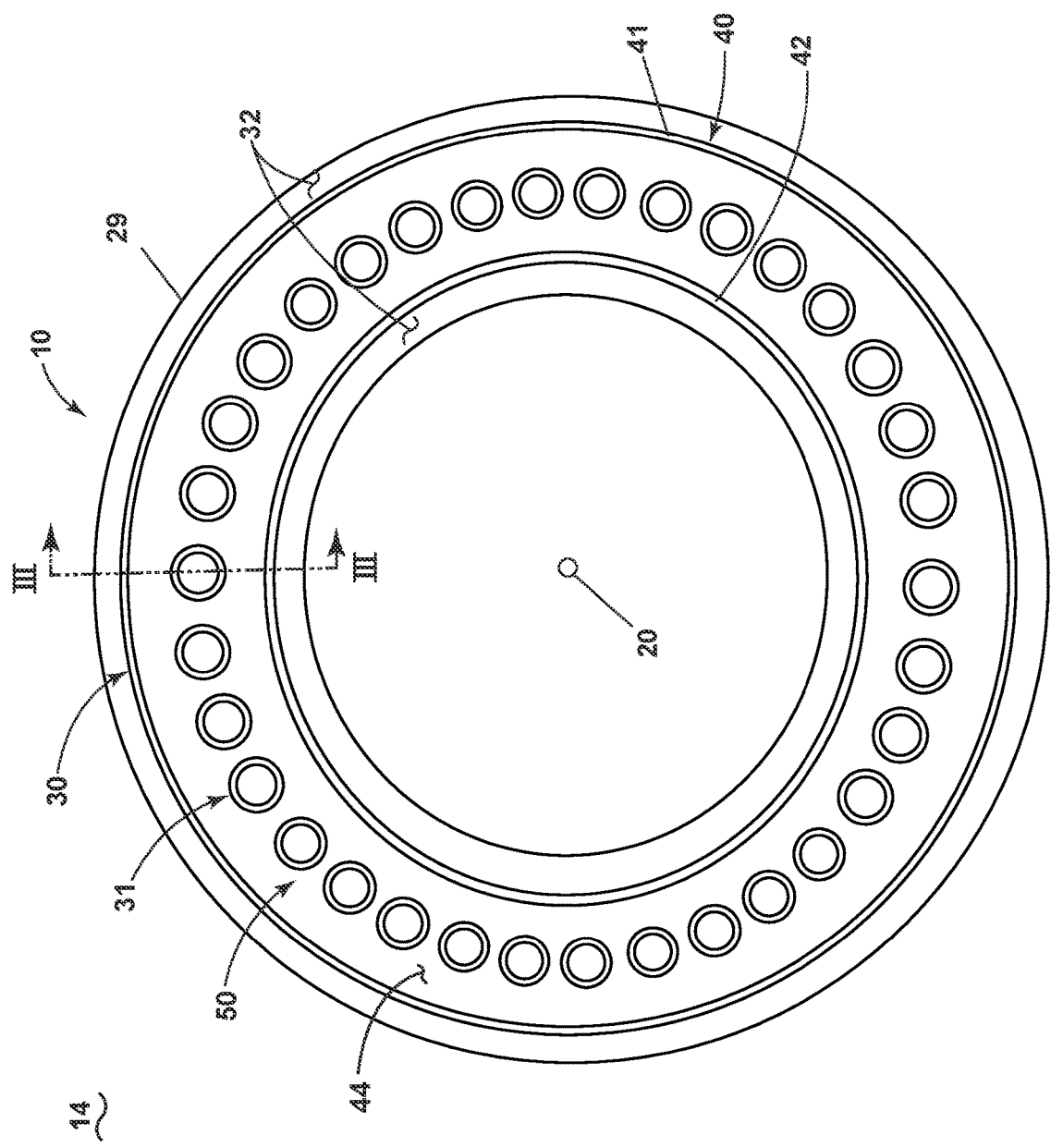
FIG. 2 is a cross-sectional view of the combustion section of FIG. 1 along line II-II in accordance with various aspects described herein.

FIG. 2 depicts a cross-sectional view of the combustion section 14 along line II-II of FIG. 1. The combustion section 14 can include a combustor 30 with an annular arrangement of fuel injectors 31 disposed around the centerline or rotational axis 20 of the turbine engine 10. It should be appreciated that the annular arrangement of fuel injectors 31 can be one or multiple fuel injectors, and one or more of the fuel injectors 31 can have different characteristics. The combustor 30 can have a can, can-annular, or annular arrangement depending on the type of engine in which the combustor 30 is located. In a non-limiting example, the combustor 30 can have a combination arrangement located with a casing 29 of the engine.

The combustor 30 can be at least partially defined by a combustor liner 40. In some examples, the combustor liner 40 can include an outer liner 41 and an inner liner 42 concentric with respect to each other and arranged in an annular fashion about the engine centerline or rotational axis 20. In some examples, the combustor liner 40 can have an annular structure about the combustor 30. In some examples, the combustor liner 40 can include multiple segments or portions collectively forming the combustor liner 40. A dome assembly 44 together with the combustor liner 40 can at least partially define a combustion chamber 50 arranged annularly about the rotational axis 20. A compressed air passage 32 can be defined at least in part by both the combustor liner 40 and the casing 29.

Figure 3:
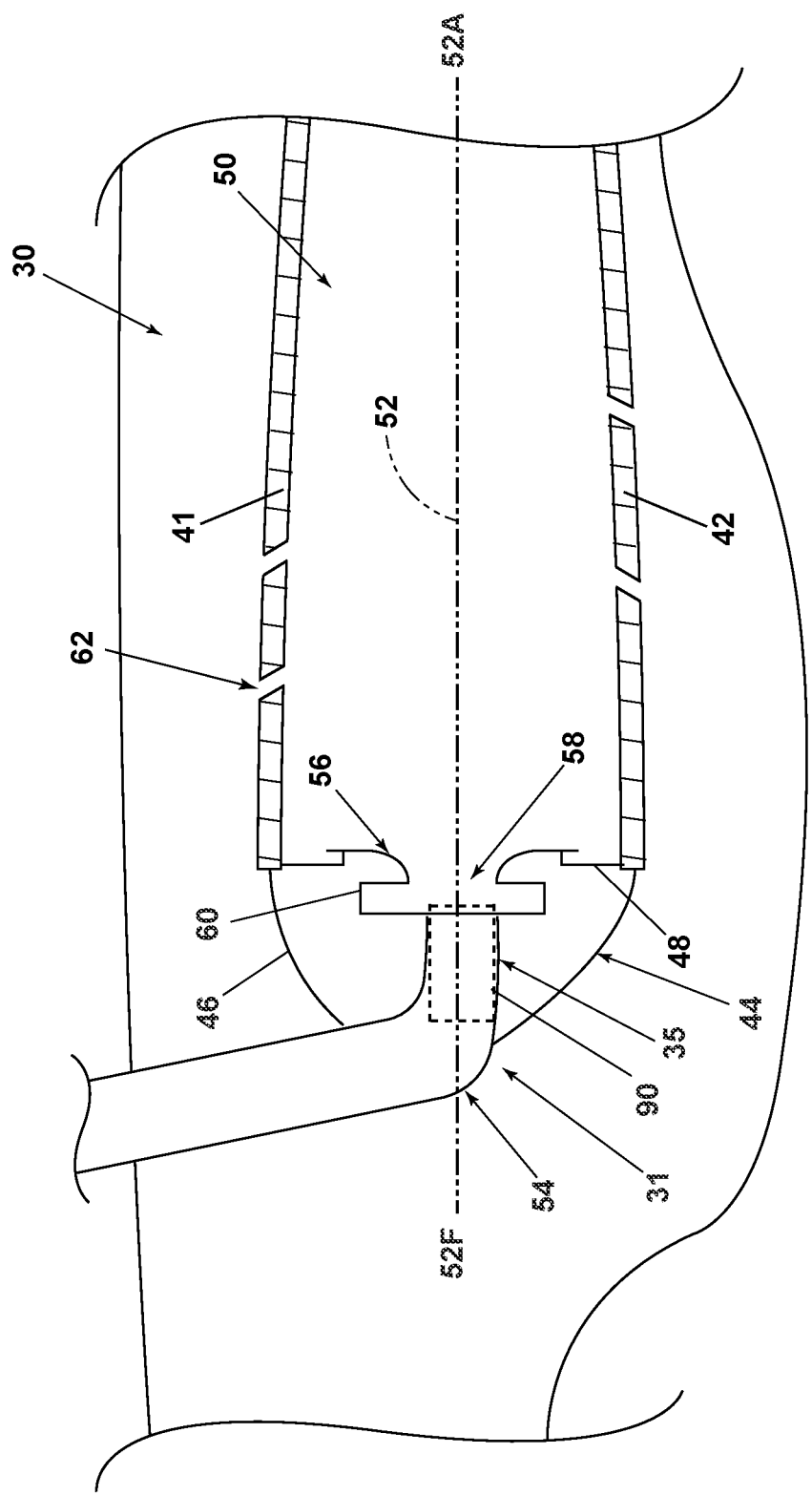
FIG. 3 is a cross-sectional view of the combustion section of FIG. 2, taken along line III-III of FIG. 2, in accordance with various aspects described herein.

FIG. 3 depicts a cross-sectional view taken along line III-III of FIG. 2 illustrating the combustion section 14. The combustor 30 can include a fuel assembly 35 configured to provide fuel to the combustor 30. The fuel assembly 35 can at least partially form the fuel injector 31. In some examples, the fuel assembly 35 can include an annular arrangement of fuel nozzles. It should be appreciated that such fuel nozzles can be organized in any suitable arrangement, pattern, grouping, or the like.

The dome assembly 44 can include a dome wall 46 and a deflector 48. The combustor liner 40 and dome assembly 44 can collectively at least partially define the combustion chamber 50 about a longitudinal axis 52. The longitudinal axis 52 can extend between a forward direction 52F and an aft direction 52A as shown.

At least one fuel supply 54 can be fluidly coupled to the combustion chamber 50 to supply fuel to the combustor 30. The fuel can include any suitable fuel, including hydrocarbon fuel, hydrogen fuel, or a mixture of differing fuel types, in non-limiting examples.

The fuel supply 54 can be disposed within the dome assembly 44 to define a fuel outlet 58. It is contemplated that air can also be supplied or provided to the combustion chamber 50 by way of the fuel outlet 58. In this manner, the fuel outlet 58 can provide a fuel-air mixture to the combustion chamber 50. In addition, in some examples, multiple fuel injectors or premixers can be located on the dome wall 46. In some examples, multiple fuel injectors or premixers can be arranged in discrete clusters or groups on the dome wall 46.

A flare cone 56 can be provided downstream of the fuel supply 54 in some examples. A swirler 60 can also be provided at the fuel assembly 35 to swirl incoming air in proximity to fuel exiting the fuel supply 54 and provide a homogeneous mixture of air and fuel entering the combustor 30.

A set of dilution holes 62 can be provided in the combustor liner 40 and configured to direct air into the combustion chamber 50 for temperature control, flame shaping, fuel-air mixing, or the like. Any number of dilution holes can be provided in the set of dilution holes 62. The set of dilution holes 62 can have any suitable patterning or arrangement over the combustor liner 40, including linear rows, irregular groups, variable hole diameters, or the like, or combinations thereof. It is also contemplated that the combustor 30 can be formed without any dilution holes.

Figure 4:
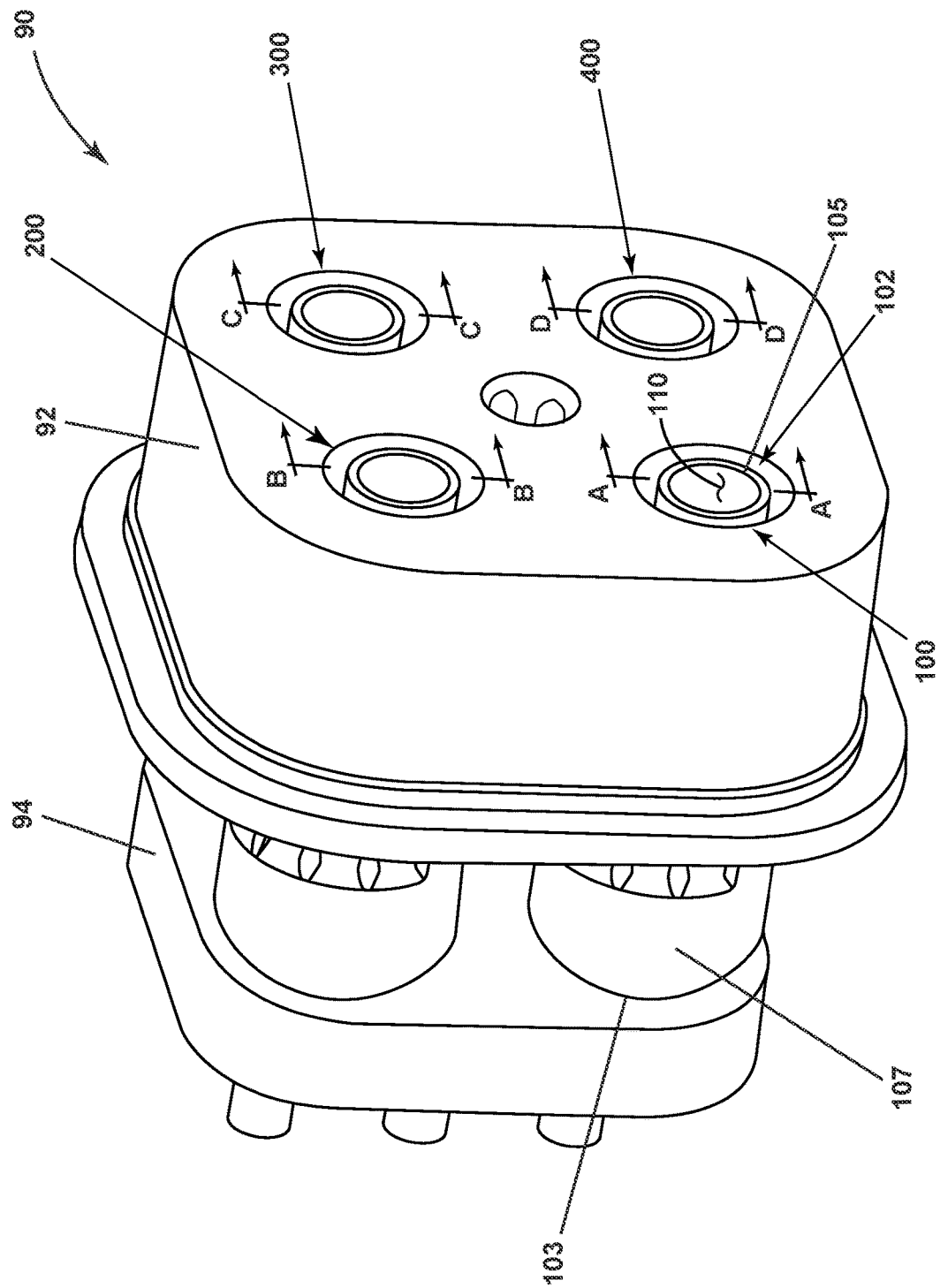
FIG. 4 is a perspective view of a fuel mixer that can be utilized in the combustor of FIG. 3 illustrating at least one fuel nozzle assembly in accordance with various aspects described herein.

A fuel mixer 90 can also be provided in the combustor 30. The fuel mixer 90 can be configured to form a mixture of fuel and air and supply the mixture to the combustion chamber 50. Turning to FIG. 4, the fuel mixer 90 can include a housing 92 and a base 94 in some examples. The fuel mixer 90 can also include at least one fuel nozzle assembly. In the illustrated example, the at least one fuel nozzle assembly includes a first fuel nozzle assembly 100, a second fuel nozzle assembly 200, a third fuel nozzle assembly 300, and a fourth fuel nozzle assembly 400. Any number of fuel nozzle assemblies can be provided, including only one.

With reference to the first fuel nozzle assembly 100, the fuel nozzle assembly 100 can include a fuel nozzle 102 defining an upstream end 103 and a downstream end 105 as shown. The at least one fuel nozzle assembly 100 can be carried, supported, or enclosed by the housing 92 at the downstream end 105. The at least one fuel nozzle assembly 100 can also be coupled to the base 94 at the upstream end 103. The fuel nozzle assembly 100 can include a plate-like base member 107 at the upstream end 103. A mixture outlet 110 can also be located at the downstream end 105 of the fuel nozzle assembly 100 as shown.

The second, third, or fourth fuel nozzle assembly 200, 300, 400 can be similar to the first fuel nozzle assembly 100.

Like parts of the second, third, and fourth fuel nozzle assemblies 200, 300, 400 will be identified herein with like numerals increased by 100, 200, and 300, respectively, with it being understood that the description of the like parts of the fuel nozzle assembly 100 applies to the fuel nozzle assemblies 200, 300, 400, except where noted. It is contemplated that each of the first, second, third, and fourth fuel nozzle assemblies 100, 200, 300, 400 can be coupled to the same base 94 in one non-limiting example. It is also contemplated that the fuel mixer 90 can include any or all of the first, second, third, or fourth fuel nozzle assembly 100, 200, 300, 400 with or without the housing 92 or base 94. While the fuel mixer 90 is described as including four fuel nozzle assemblies having different configurations, it will be understood that the fuel mixer 90 can include multiple identical fuel nozzle assemblies, or fuel nozzle assemblies having combinations of features or aspects of the first, second, third or fourth fuel nozzle assemblies 100, 200, 300, 400 described herein, or the like.

Figure 5:
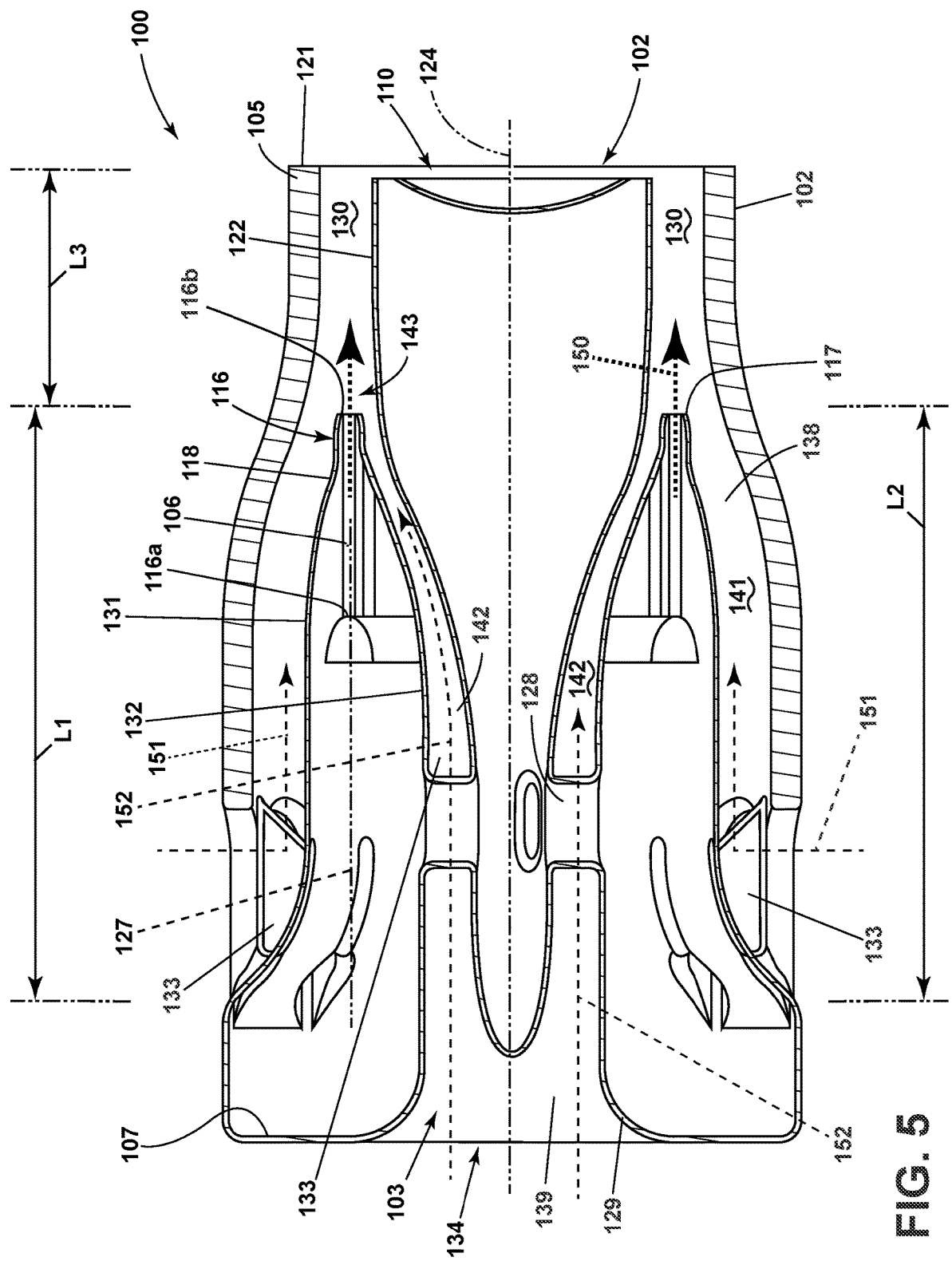
FIG. 5 is a side cross-sectional view of a first fuel nozzle assembly of FIG. 4, taken along line A-A of FIG. 4, illustrating a fuel nozzle in accordance with various aspects described herein.

FIG. 5 illustrates a cross-sectional view of the first fuel nozzle assembly 100 with the fuel nozzle 102. The fuel nozzle assembly 100 can include an outer wall 121 bounding an interior. In some examples, a generally cylindrical member or tube can form the outer wall 121. In some examples, a center body 122 can include a cylindrical portion, a conical portion, or combinations thereof. The outer wall 121 can at least partially circumferentially surround the center body 122. In some examples the outer wall 121 and the center body 122 can be concentrically aligned.

The center body 122 can also extend axially from the upstream end 103 to the downstream end 105 of the fuel nozzle assembly 100. The center body 122 can define a first longitudinal axis 124. The first longitudinal axis 124 can be co-axial with the rotational axis 20 (FIG. 1), though this need not be the case.

An annular body 129 can be provided within the interior. The annular body 129 can divide the interior into a radially outer passage 138 and a radially inner passage 139 as shown. The center body 122 can be centrally disposed within the inner passage 139 of the annular body 129 as shown. In some examples, the center body 122 can be connected to the annular body 129 by struts 128.

A fuel supply passage 106 can also be provided within the interior of the annular body 129. The fuel supply passage 106 can have an annular arrangement though this need not be the case. A set of fuel outlets 116 can be formed in the annular body 129 and supplied with fuel from the fuel supply passage 106. The set of fuel outlets 116 can be disposed radially between the center body 122 and the outer wall 121. The fuel outlets 116 can be circumferentially spaced from each other.

The fuel supply passage 106 can define a second longitudinal axis 127. The second longitudinal axis 127 can be parallel to the first longitudinal axis 124, though this need not be the case.

A common flow passage 130 can be defined radially between the center body 122 and the outer wall 121 downstream of the fuel outlets 116. In some examples, the set of fuel outlets 116 can be disposed upstream of the common flow passage 130. Each fuel outlet 116 can be fluidly coupled at a respective upstream end 116a to the fuel supply passage 106 to supply a respective fuel flow 150 (indicated by an arrow) therefrom. In some examples, the fuel supply passage 106 can be communicatively coupled to a fuel source or fuel supply to receive a flow of fuel therefrom from in a known manner, such as via a fuel pump. In some examples, the fuel supply passage 106 can define an annular shape. In some aspects, a portion of the fuel supply passage 106 can be substantially concentric with the center body 122.

The fuel outlets 116 can be further fluidly coupled at a respective downstream end 116b to the common flow passage 130 and configured to supply the respective fuel flow of received fuel to the common flow passage 130. In some examples, the downstream end 116b of fuel outlet 116 can include a respective jet or nozzle 117. The nozzle 117 can form an annular outlet. The fuel outlets 116 can comprise a respective tubular member 118 that fluidly couples the respective upstream end 116a to the downstream end 116b.

The fuel outlets 116 are arranged to inject the respective fuel flow 150 into the common flow passage 130 at a convergence of a first air flow 151 and a second air flow 152 to thereby sandwich the respective fuel flow 150 between the first air flow 151 and second air flow 152. In some examples, the fuel flow 150, and flame body (not shown) can be maintained radially inboard from the outer wall 121 and center body 122, or otherwise substantially centrally located within the common flow passage 130. Such aspects can advantageously maintain a low shear force between the fuel and air while keeping the fuel away from the lower flow velocity regions proximal to the outer wall 121 and center body 122. Reduction of the shear reduces the shear layer deficit between the airflow and the fuel flow. The reduction of this deficit provides for improved distribution for the radial velocity profile, which provides for maintaining a high axial velocity for both the fuel and the airflow. The high axial velocity can reduce or eliminate the occurrence of flame holding on the fuel nozzle 102, permitting the use of higher temperature fuels, such as hydrogen fuels.

The annular body 129 can comprise a first annular wall 131 and a second annular wall 132. The first annular wall 131 can be radially disposed between the outer wall 121 and the set of fuel outlets 116. The second annular wall 132 can be radially disposed between the center body and the first annular wall 131. In some examples, the first annular wall 131 and the outer wall 121 can be concentrically aligned. The second annular wall 132 and the center body 122 can also be concentrically aligned.

A first compressed air flow passage 141 and a second compressed air flow passage 142 can also be provided in the fuel nozzle 102. In some examples, the first and second compressed air flow passages 141, 142 can be fluidly coupled to a common source of compressed air. In some examples, the first compressed air flow passage 141 can receive a separate supply of air from the second compressed air flow passage 142.

The first compressed air flow passage 141 can be defined between the outer wall 121 and the first annular wall 131. In some examples, the first compressed air flow passage 141 can extend from the upstream end 103 of the fuel nozzle assembly 100 to the common flow passage 130. The first compressed air flow passage 141 can be in fluid communication with the common flow passage 130. The first compressed air flow passage 141 can be disposed radially outward from the set of fuel outlets 116.

The second compressed air flow passage 142 can be defined between the second annular wall 132 and the center body 122. The second compressed air flow passage 142 can be disposed radially inward from the set of fuel outlets 116. The second compressed air flow passage 142 can be in fluid communication with the common flow passage 130.

The first compressed air flow passage 141 and the second compressed air flow passage 142 can combine at an intersection 143. The common flow passage 130 can be fluidly coupled to the intersection 143. The common flow passage 130 can also be fluidly coupled to the fuel outlet 116. In this manner, the intersection 143 can be fluidly coupled to the fuel outlet 116.

In some examples, at least one first air inlet 133 can be provided. In the illustrated example, the first air inlet 133 is shown extending through the outer wall 121. It is also contemplated that the at least one first air inlet 133 can be defined at the upstream end 103 of the fuel nozzle assembly 100, or through the base member 107, or through the outer wall 121, or combinations thereof, in non-limiting examples. In some examples, multiple first air inlets 133 can be circumferentially spaced from each other. The at least one first air inlet 133 can be in fluid communication with the first compressed air flow passage 141.

In some examples, at least one second air inlet 134 can be provided. In the illustrated example, the second air inlet 134 is shown extending through the base member 107. It is also contemplated that the at least one second air inlet 134 can be defined at the upstream end 103 of the fuel nozzle assembly 100, or through the base member 107, or through the outer wall 121, or combinations thereof, in non-limiting examples. In some examples, the second air inlets 134 can be circumferentially spaced from each other. The second air inlet 134 can be in fluid communication with the second compressed air flow passage 142.

The first air flow 151 (indicated by dashed arrow) can be provided through the first air inlet 133 to the first compressed air flow passage 141. For example, a particular first air inlet 133 defined through an upstream end of the outer wall 121 can convey the first air flow 151 radially to the first compressed air flow passage 141. Additionally or alternatively, a particular first air inlet 133 defined through the base member 107 can convey a respective first air flow 151 axially to the first compressed air flow passage 141. The first air flow 151 can then be conveyed via the first compressed air flow passage 141 to the common flow passage 130.

The second air flow 152 (indicated by dashed arrow) can be provided through the at least one second air inlet 134 to the second compressed air flow passage 142. The second air flow 152 can be conveyed via the second compressed air flow passage 142 to the common flow passage 130. For example, a particular second air inlet 134 defined through an upstream end of the outer wall 121 can convey a respective second air flow 152 radially to the second compressed air flow passage 142. Additionally or alternatively, a particular second air inlet 134 defined through the base member 107 can convey a respective second air flow 152 axially to the second compressed air flow passage 142. The second air flow 152 can then be conveyed via the second compressed air flow passage 142 to the common flow passage 130. It is further contemplated that the first air flow 151 and second air flow 152 can be arranged to converge proximate the fuel outlets 116.

The first compressed air flow passage 141 can define a first axial length L1. The first axial length L1 can extend from the first air inlets 133 to the fuel outlets 116. It should be understood that the fuel outlets 116 can form an upstream end of the common flow passage 130. The second compressed air flow passage 142 can define a second axial length L2. The second axial length L2 can extend from the second air inlet 134 to the fuel outlets 116. The first axial length L1 can be the same as or different from the second axial length L2. In addition, the common flow passage 130 can define a third axial length L3 as shown. The third axial length L3 can extend from the fuel outlets 116 to the downstream end of the mixture outlet 110 as shown.

In some examples, the respective lengths of the first axial length L1 and the second axial length L2 can be determined to reduce turbulence, wakes, or other non-uniformities present in the received respective first air flow 151 and second air flow 152 prior to mixing with the fuel flow 150. For example, the first axial length L1 of the common flow passage 130 can be determined to reduce or prevent flash-back or flame-holding from the combustor.

It is also contemplated that the common flow passage 130 can have a substantially constant cross-sectional area along the first axial length L3 from upstream to downstream. The constant cross-sectional area of the common flow passage 130 for a determined third axial length L3 can maintain a high velocity of the fuel flow 150 to avoid flash-back. The first axial length L1 and second axial length L2 can be predetermined or selected to streamline the air flow upstream of the fuel outlets 116. As will be appreciated, streamlining the airflow can beneficially reduce or eliminate flow asymmetry, circumferential variations, and wake. Additionally, the third axial length L3 can be predetermined to achieve a desired level of fuel-air mixing, while avoiding flame-holding or flashback.

Figure 6:
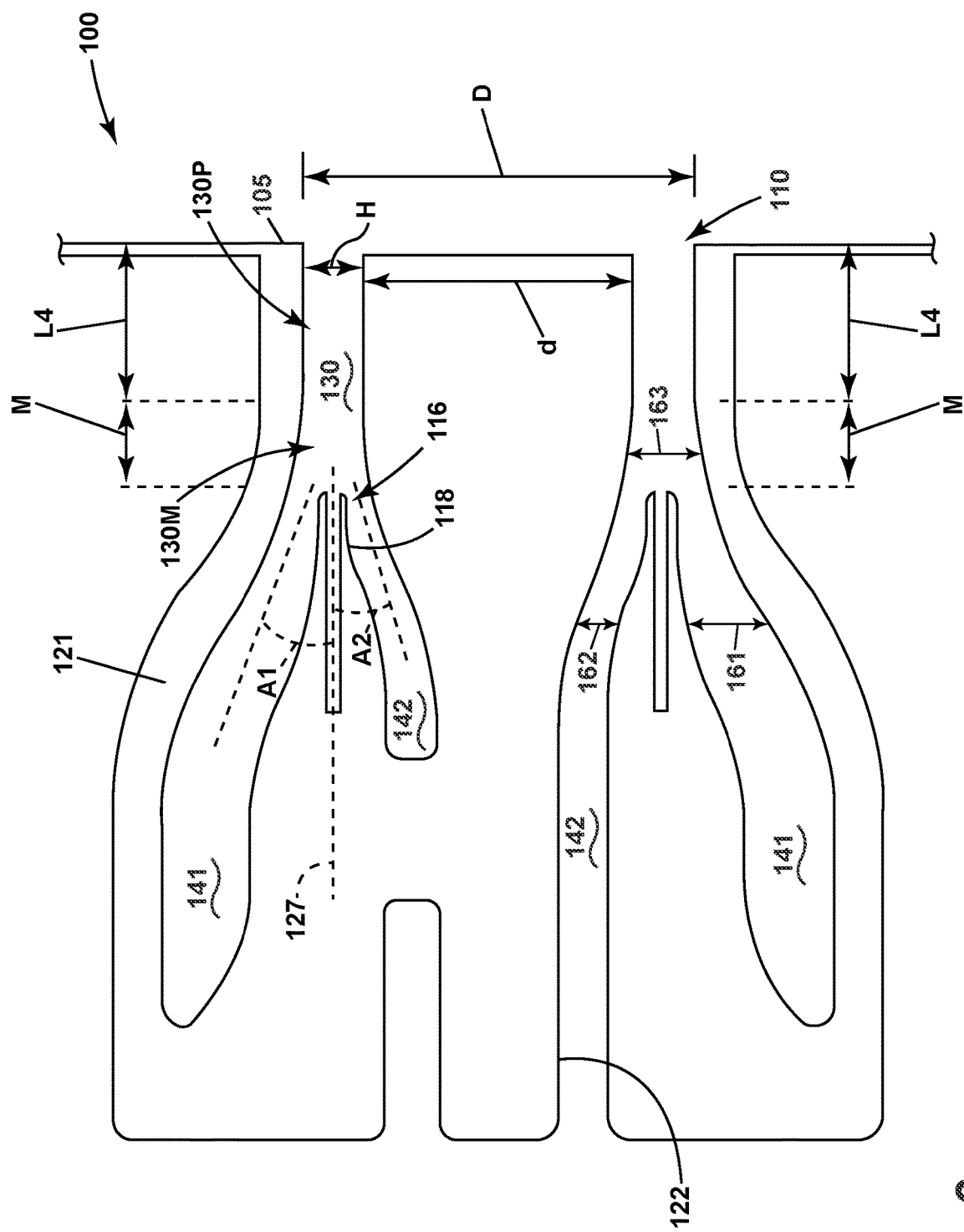
FIG. 6 is a side schematic view of the first fuel nozzle assembly of FIG. 4 illustrating a passage angle.

Turning to FIG. 6, a schematic cross-sectional view of the fuel nozzle assembly 100 is shown. The mixture outlet 110 can define an outlet diameter (designated "D"), and the downstream end of the center body 122 can define an outer diameter (designated "d").

The first compressed air flow passage 141 and second compressed air flow passage 142 can be arranged to converge with respect to each other, proximate the fuel outlets 116. For example, the first compressed air flow passage 141 can define a first angle (designated "A1") with respect to the second longitudinal axis 127. Similarly, the second compressed air flow passage 142 can define a second angle (designated "A2") with respect to the second longitudinal axis 127. It is contemplated that the first angle A1 and second angle A2 can each vary, independently of the other, from 0 degrees to 90 degrees, relative to the second longitudinal axis 127.

The common flow passage 130 can include an annular mixing portion 130M and an annular output portion 130P downstream of the mixing portion 130M. The mixing portion 130M can define an axial mixing length (designated "M"). The output portion 130P can define an axial output length (designated "L4"). The annular mixing portion 130M can be in fluid communication with the annular output portion 130P.

In some examples, the common flow passage 130 can define a common flow passage height (designated "H") as well as a cross-sectional area 163. The cross-sectional area 163 can be constant or variable along the common flow passage 130. In one non-limiting example, the cross-sectional area 163 can be converging along the axial mixing length M, from upstream to downstream. In other non-limiting aspects, the cross-sectional area 163 along the axial mixing length M can be diverging from upstream to downstream. In still other non-limiting aspects, the cross-sectional area 163 along the axial mixing length M can be constant from upstream to downstream. In some examples, the cross-sectional area 163 can vary by less than 20% along the axial mixing length M or the axial output length L4.

It is contemplated that the common flow passage height H at the downstream end 105 can be determined by either or both of the nozzle outlet diameter D or the center body outer diameter d. In one non-limiting example, the common flow passage height H can be determined as 50% of the difference between the nozzle outlet diameter D and the center body outer diameter d. In various non-limiting aspects, the ratio of the nozzle outlet diameter D and the center body outer diameter d can be adapted or configured as desired, for example, depending on a desired target effective area at the mixture outlet 110. In some examples, the dimension of the axial output length L4 can be within a range of between 10% and 40% of the common flow passage height H. For example, in some non-limiting aspects, the axial output length L4 can have a dimension of between 5 mm to 20 mm. Additionally or alternatively, in some non-limiting aspects, the dimension of the axial output length L4 can be within a range of between from 0 to 25% of the axial mixing length M. For example, in some non-limiting aspects, the axial output length L4 can have a dimension of between 0 mm to 20 mm.

It is further contemplated that the first compressed air flow passage 141 can define a first cross-sectional area 161, and the second compressed air flow passage 142 can define a second cross-sectional area 162 as shown. In some examples, the second cross-sectional area 162 can be smaller than the first cross-sectional area 161. In such a case, a flow speed through the first compressed air flow passage 141 can be slower than a flow speed through the second compressed air flow passage 142. In some examples, the first cross-sectional area 161 can be the same size as the second cross-sectional area 162. In some examples, either or both of the first cross-sectional area 161 or second cross-sectional area 162 can be varied or constant along the respective first compressed air flow passage 141 or second compressed air flow passage 142.

Figure 7:
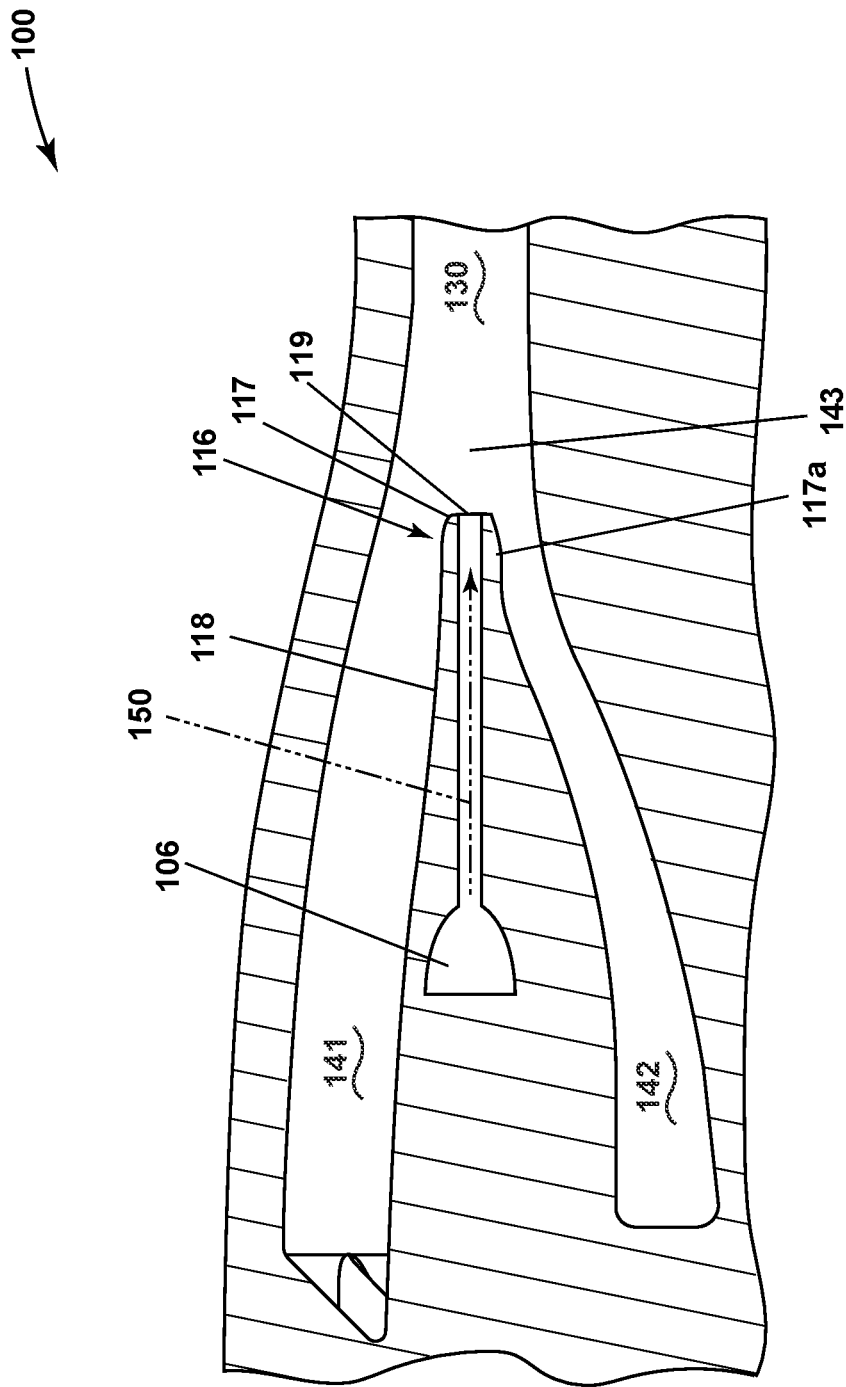
FIG. 7 is a side cross-sectional view of the first fuel nozzle assembly of FIG. 4, taken along line A-A, illustrating a fuel outlet.
Figure 8:
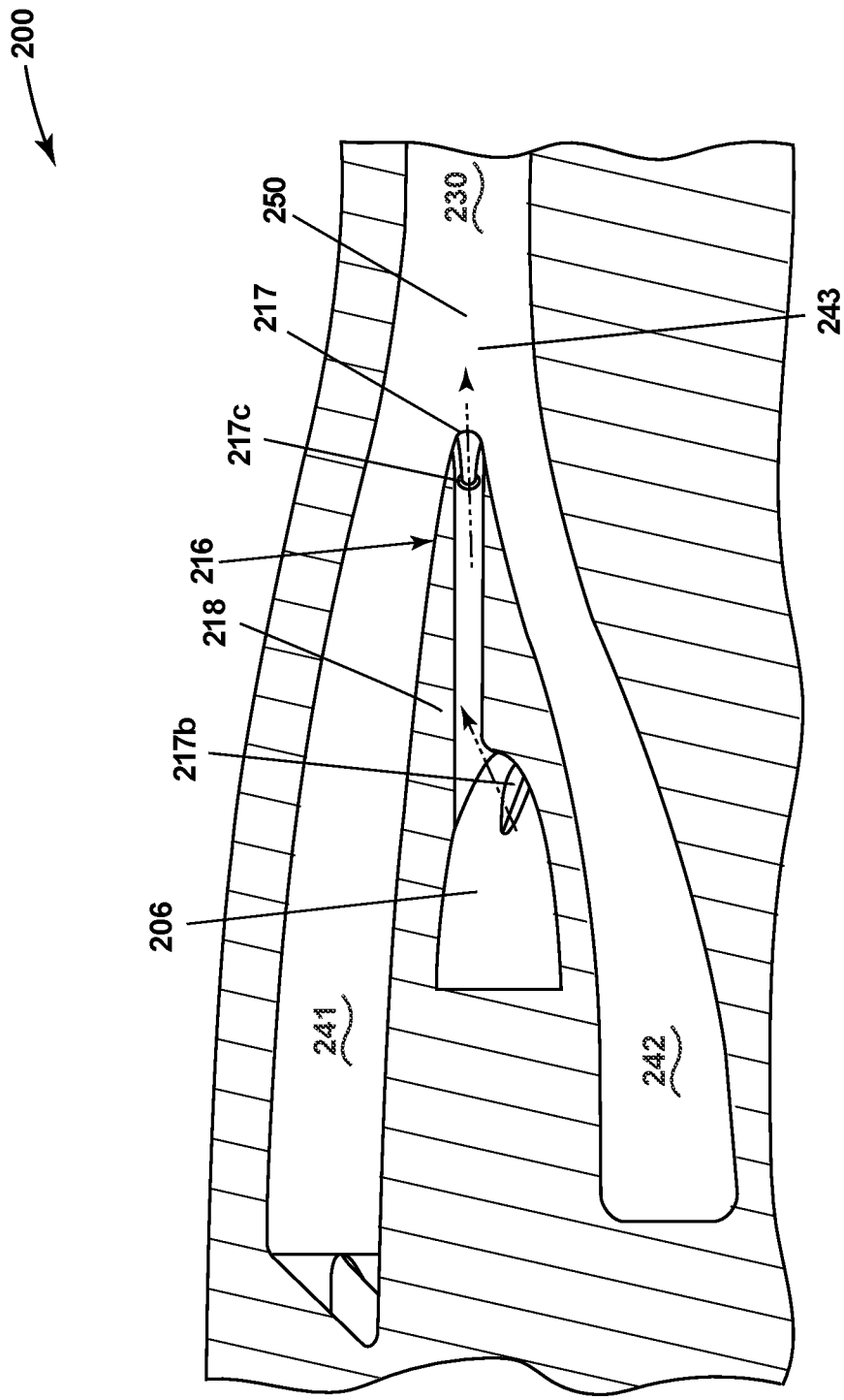
FIG. 8 is a side cross-sectional view of a second fuel nozzle assembly of FIG. 4, taken along line B-B, illustrating another fuel outlet.
Figure 9:
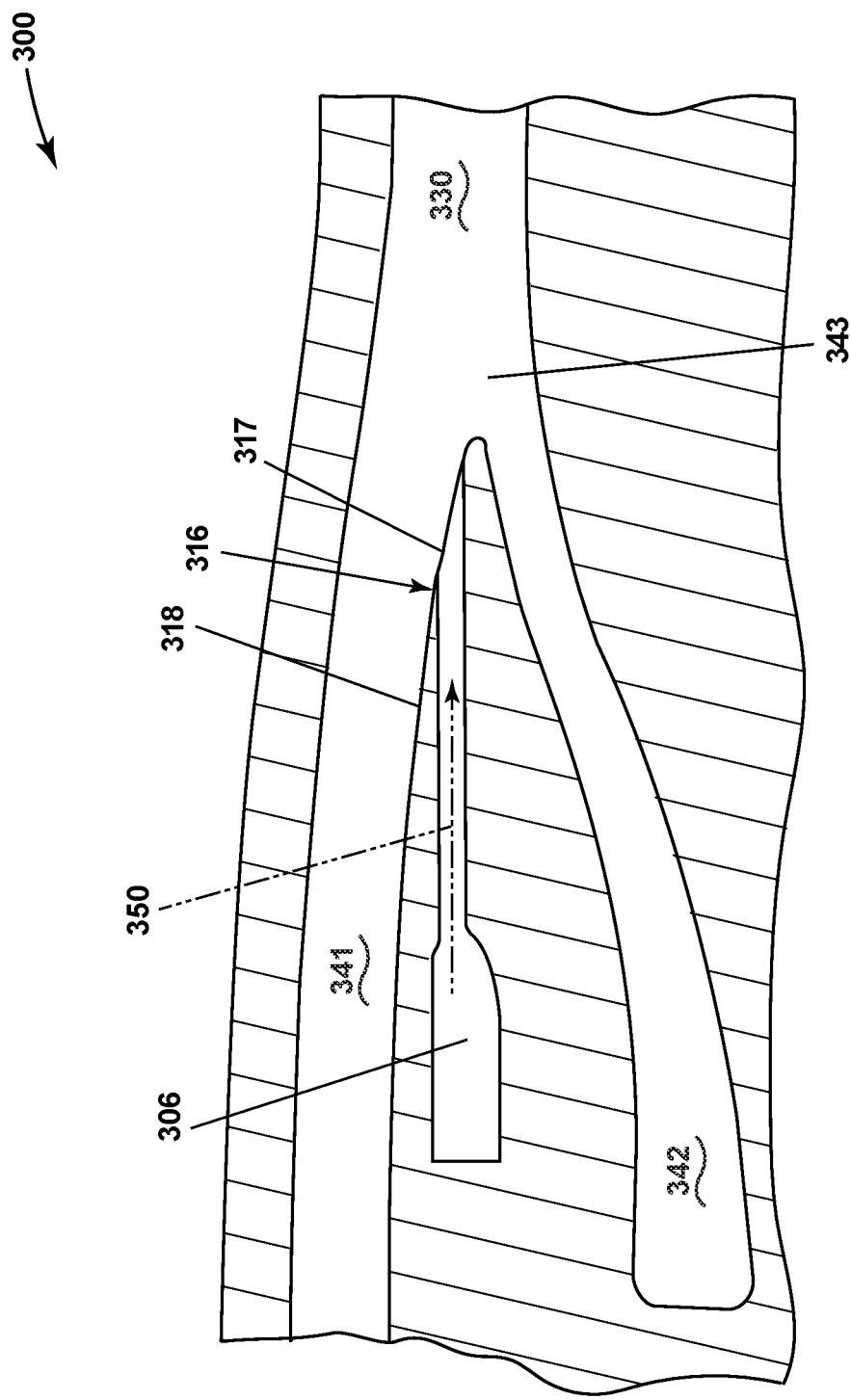
FIG. 9 is a side cross-sectional view of a third fuel nozzle assembly of FIG. 4, taken along line C-C, illustrating another fuel outlet.

FIGS. 7-9 illustrate some exemplary configurations for a fuel outlet that can be utilized in the fuel mixer 90 (FIG. 4) in accordance with various aspects described herein. FIG. 7 illustrates the fuel outlet 116 of the first fuel nozzle assembly 100 in a first exemplary configuration. The fuel supply passage 106, first compressed air flow passage 141, second air flow passage 142, and common flow passage 130 are shown. A boss 117a can be provided surrounding the fuel outlet 116. The boss 117a can define a circular orifice 119 therethrough. The orifice 119 can be fluidly coupled to the tubular member 118. The nozzle 117 with orifice 119 can be oriented to provide the respective fuel flow 150 directly into the common flow passage 130 at the intersection 143.

FIG. 8 illustrates the fuel nozzle assembly 200 (FIG. 4) having a fuel outlet 216 in a second exemplary configuration. The fuel nozzle assembly 200 includes a fuel supply passage 206, a nozzle 217, a first compressed air flow passage 241, a second air flow passage 242, and a common flow passage 230. The fuel outlet 216 can include a hollow sub-passage with an inlet 217b and a sub-passage outlet 217c as shown. The sub-passage outlet 217c can be positioned upstream of the nozzle 217. In this manner, the nozzle 217 can be configured to diffuse or disperse a fuel flow 250 within the fuel outlet 216 upstream of the intersection 243 and common flow passage 230.

FIG. 9 illustrates the fuel nozzle assembly 300 (FIG. 4) having a fuel outlet 116 in a third exemplary configuration. The fuel nozzle assembly 300 includes a fuel supply passage 306, a nozzle 317, a first compressed air flow passage 341, a second air flow passage 342, and a common flow passage 330. In the illustrated example, the nozzle 317 is positioned at a downstream end of the first compressed air flow passage 341 upstream of the common flow passage 330. It is also contemplated that the nozzle 317 can be positioned at a downstream end of the second compressed air flow passage 342 in another non-limiting example. In this manner, the nozzle 317 can be oriented or configured to mix a fuel flow 350 into one of the first or second compressed air flow passage 341, 342 to form a first mixture flow, prior to mixing with air from the other of the first or second compressed air flow passage 341, 342. The first mixture flow can converge with air from the other of the first or second compressed air flow passage 341, 342 to form a second mixture flow at the intersection 343.

FIGS. 10-11 illustrate some exemplary configurations for the outer wall that can be utilized in the fuel mixer 90 (FIG. 4) in accordance with various aspects described herein. FIG. 10 illustrates the second fuel nozzle assembly 200 having an outer wall 221, the center body 222, and a mixture outlet 210. In the example shown, the outer wall 221 can be oriented with respect to the center body 222 to form a decreasing cross-sectional area within the common flow passage 230 along the first axial length L1. Such a decreasing cross-sectional area can form a converging common flow passage 230 in a direction toward the mixture outlet 210. In some examples, such a converging common flow passage 230 can be arranged by converging the outer wall 221 while keeping the center body 222 cylindrical with a constant cross-sectional area. In operation, such aspects having the converging cross-sectional area of the common flow passage 230 can beneficially enhance the fuel air mixing through the common flow passage 230.

FIG. 11 illustrates the third fuel nozzle assembly 300 having an outer wall 321, the center body 322, and a mixture outlet 310. In the example shown, the outer wall 321 can be oriented with respect to the center body 322 to form an increasing cross-sectional area within the common flow passage along the first axial length L1. Such an increasing cross-sectional area can form a diverging common flow passage 330 in a direction toward the mixture outlet 310. In operation, the diverging of the common flow passage 330 enables upstream radial spreading of the fuel and air and directs the fuel-air mixture radially outward along the common flow passage 330 to improve mixing of the fuel and air.

Figure 12:
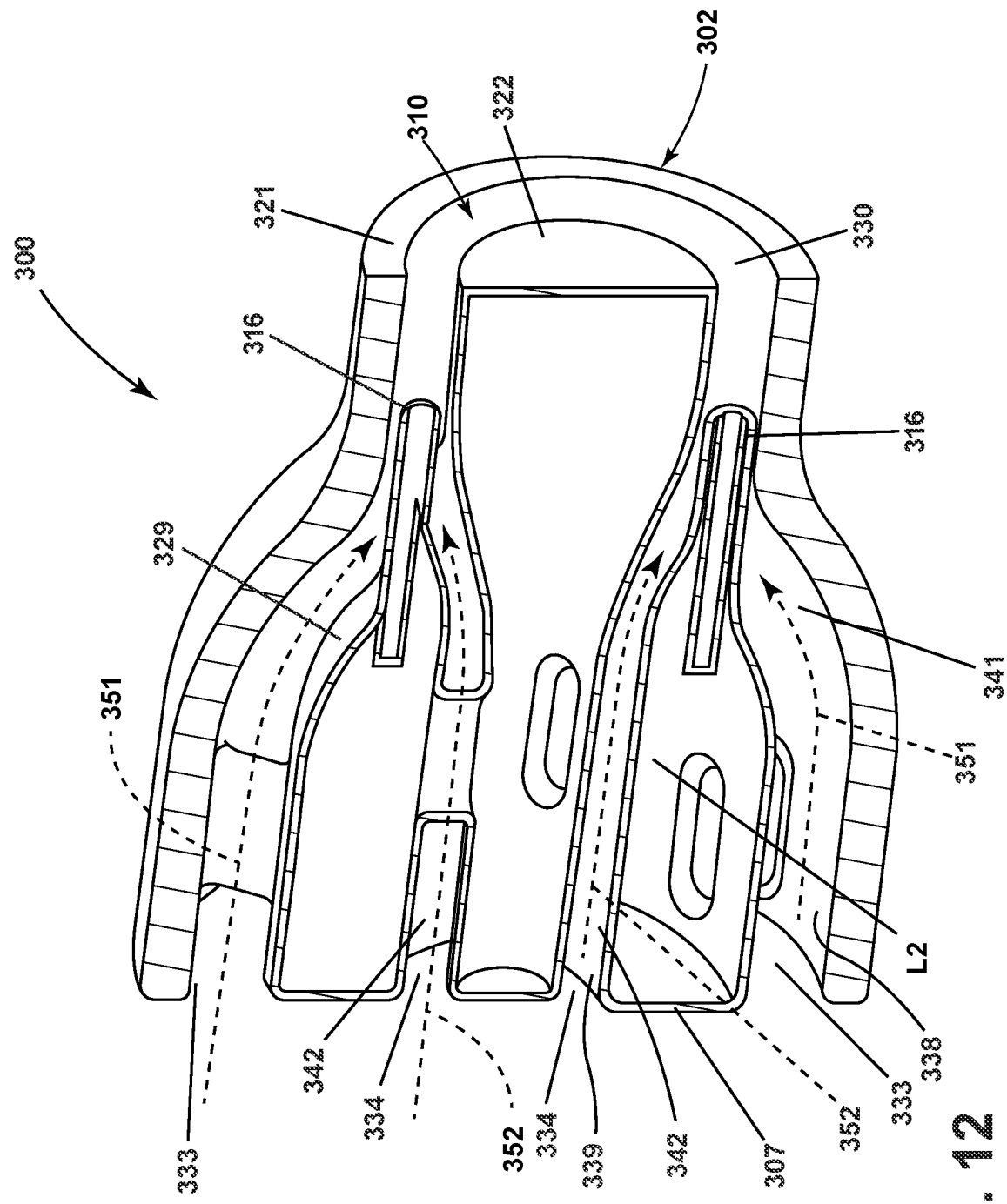
FIG. 12 is a cross-sectional view of the second fuel nozzle assembly of FIG. 4, taken along line B-B, in accordance with various aspects described herein.
Figure 13:
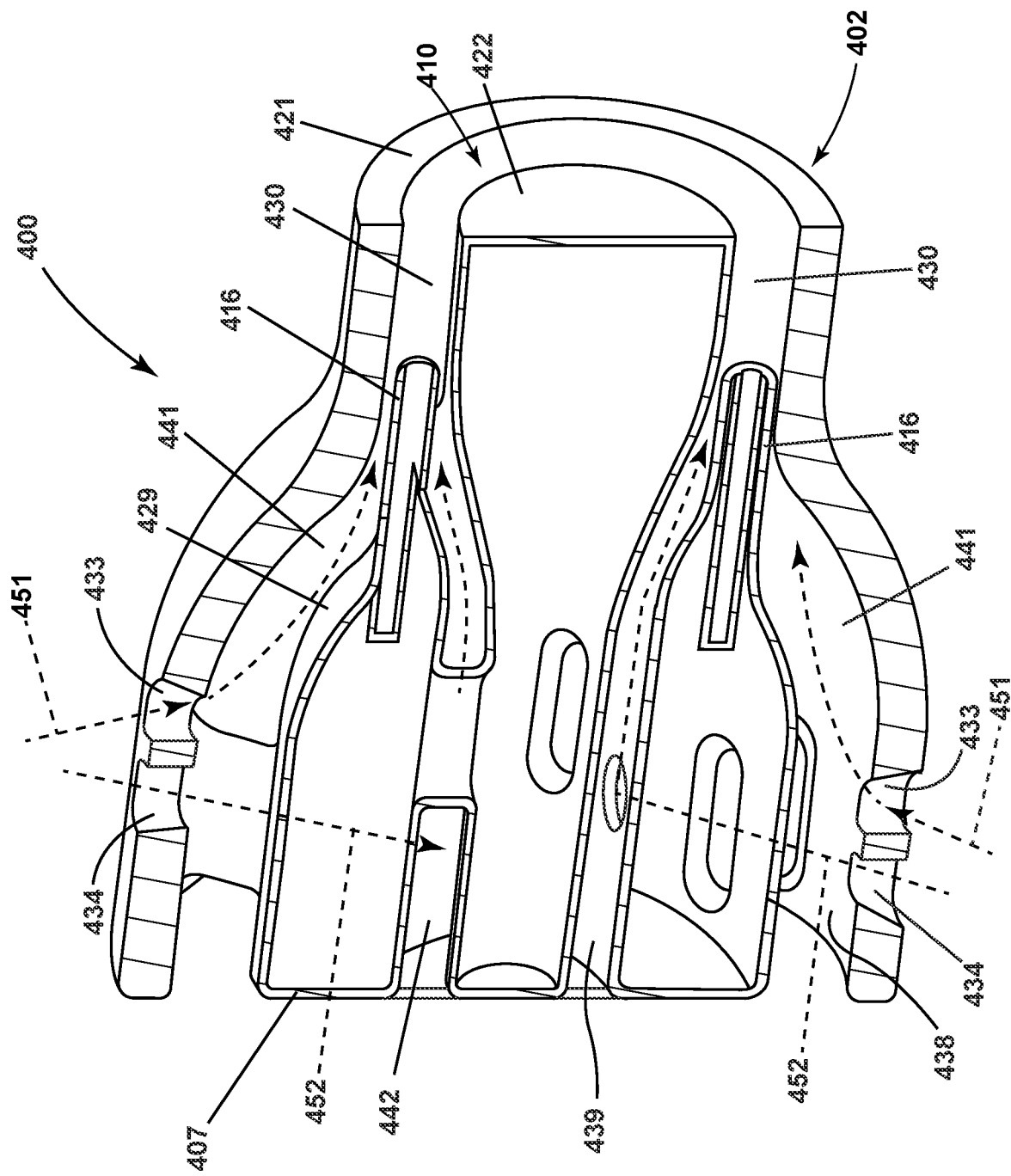
FIG. 13 is a cross-sectional view of a fourth fuel nozzle assembly of FIG. 4, taken along line D-D, in accordance with various aspects described herein.

FIGS. 12-13 generally illustrate exemplary configurations of air inlets that can be utilized in the fuel mixer 90 (FIG. 4) in accordance with various aspects described herein. Referring now to FIG. 12, the third fuel nozzle assembly 300 is illustrated in a cross-sectional view along line C-C of FIG. 4.

The third fuel nozzle assembly 300 can include a fuel nozzle 302 with a base member 307, the outer wall 321, the fuel outlet 316, the center body 322, an annular body 329, the common flow passage 330, the first and second compressed air flow passages 341, 342, a radially outer passage 338, a radially inner passage 339, at least one first air inlet 333, at least one second air inlet 334, and the mixture outlet 310 as shown. A first air flow 351 and a second air flow 352 are illustrated through the fuel nozzle assembly 300.

One difference compared to the fuel nozzle assembly 100 is that each of the first air inlet 333 and the second air inlet 334 can be provided in the base member 307 as shown. In this manner, the first and second air inlets 333, 334 can convey the respective first air flow 351 and second air flow 352 axially to the respective first and second compressed air flow passages 341, 342. The first and second air flows 351, 352 can also be conveyed to the common flow passage 330 toward the mixture outlet 310 as shown.

Referring now to FIG. 13, the fourth fuel nozzle assembly 400 is illustrated in a cross-sectional view along line D-D of FIG. 4.

The fuel nozzle assembly 400 can include a fuel nozzle 402 with a base member 407, an outer wall 421, a fuel outlet 416, a center body 422, an annular body 429, a common flow passage 430, first and second compressed air flow passages 441, 442, a radially outer passage 438, a radially inner passage 439, at least one first air inlet 433, at least one second air inlet 434, and a mixture outlet 410 as shown. A first air flow 451 and second air flow 452 are illustrated through the fuel nozzle assembly 400.

One difference compared to the fuel nozzle assembly 100 is that each of the first air inlet 433 and the second air inlet 434 can be provided in the outer wall 421 as shown. In this manner, the first and second air inlets 433, 434 can convey the respective first air flow 451 and second air flow 452 radially with respect to the respective first and second compressed air flow passages 441, 442. The first and second air flows 451, 452 can also be conveyed to the common flow passage 430 toward the mixture outlet 410 as shown.

Aspects of the disclosure provide for a fuel nozzle assembly with compressed air flow passages defining co-flowing air circuits surrounding the set of fuel ports. The air circuits can be conveyed to the common flow passage on radially opposing sides (e.g., a radially inboard side and a radially outboard side, respectively) of the respective fuel flow from the set of fuel ports. The co-flowing air circuits can be converged at the upstream end of the common flow passage. In some examples, the fuel flow can be injected into the common flow passage at a convergence or intersection of the co-flowing air streams, thereby sandwiching the fuel flow or forming a layered flow. In this manner, the fuel flow and flame body can be maintained radially inboard or spaced apart from the outer wall and center body, or otherwise substantially centrally located within the common flow passage.

Aspects of the disclosure additionally provide for a method of mixing fuel in a combustor of a turbine engine. The method can include flowing a first compressed air flow, flowing a second compressed air flow, and converging the first and second compressed air flows at an intersection to form a converged air flow. The method can also include introducing fuel to at least one of the first compressed air flow, the second compressed air flow, or the converged air flow to form a mixture flow, and flowing at least the mixture flow to a mixture outlet of a fuel mixer of the combustor. The method can also include introducing air to the converged air flow to form the mixture flow. The method can also include introducing air to the first compressed air flow upstream of the converged air flow to form the mixture flow.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A turbine engine, comprising a compressor section, a combustion section, and a turbine section in serial flow arrangement, the combustion section having a combustor with a fuel mixer comprising: an outer wall defining a longitudinal direction and having a mixture outlet, a first compressed air flow passage and a second compressed air flow passage forming an intersection, a common flow passage fluidly coupled to the intersection and to the mixture outlet, and a fuel supply passage having a fuel outlet fluidly coupled to at least one of the first compressed air flow passage, the second compressed air flow passage, or the intersection.

The turbine engine of any preceding clause, further comprising a center body located within the outer wall and at least partially forming an annular profile for each of the first compressed air flow passage, the second compressed air flow passage, and the intersection between the center body and the outer wall.

The turbine engine of any preceding clause, wherein at least one of the fuel outlet or the mixture outlet is annular.

The turbine engine of any preceding clause, wherein the common flow passage defines a mixing portion and an outlet portion, with the mixing portion adjacent the fuel outlet and the outlet portion adjacent the mixture outlet.

The turbine engine of any preceding clause, wherein the common flow passage defines a cross-sectional area that varies less than 20% within the mixing portion.

The turbine engine of any preceding clause, wherein the outer wall forms an acute angle with the center body.

The turbine engine of any preceding clause, wherein the outer wall and the center body form one of a converging cross-sectional area or a diverging cross-sectional area along a downstream direction through the outlet portion.

The turbine engine of any preceding clause, wherein the first compressed air flow passage comprises a first cross-sectional area, and the second compressed air flow passage comprises a second cross-sectional area different from the first cross-sectional area upstream of the intersection.

The turbine engine of any preceding clause, wherein the fuel outlet is fluidly coupled to the intersection.

The turbine engine of any preceding clause, wherein the fuel outlet is fluidly coupled to the first compressed air flow passage upstream of the intersection.

The turbine engine of any preceding clause, wherein the fuel outlet comprises a hollow sub-passage having a sub-passage outlet upstream of the intersection.

The turbine engine of any preceding clause, wherein the first compressed air flow passage defines a first angle with respect to the fuel supply passage and the second compressed air flow passage defines a second angle with respect to the fuel supply passage, with the first angle being different from the second angle.

The turbine engine of any preceding clause, wherein the first angle is larger than the second angle.

The turbine engine of any preceding clause, wherein the first compressed air flow passage comprises a first inlet and the second compressed air flow passage comprises a second inlet, with at least one of the first inlet or the second inlet oriented to provide compressed air along a direction that is one of parallel or perpendicular to the longitudinal direction.

The turbine engine of any preceding clause, wherein at least one of the first inlet or the second inlet are located in the outer wall.

A combustor for a turbine engine, comprising a combustor liner at least partially defining a combustion chamber, and a fuel mixer fluidly coupled to the combustion chamber, the fuel mixer comprising: an outer wall defining a longitudinal direction and having a mixture outlet, a first compressed air flow passage and a second compressed air flow passage forming an intersection, a common flow passage fluidly coupled to the intersection and to the mixture outlet, and a fuel supply passage having a fuel outlet fluidly coupled to at least one of the first compressed air flow passage, the second compressed air flow passage, or the intersection.

The combustor of any preceding clause, further comprising a center body located within the outer wall and at least partially forming an annular profile for each of the first compressed air flow passage, the second compressed air flow passage, and the intersection between the center body and the outer wall.

The combustor of any preceding clause, wherein at least one of the fuel outlet or the mixture outlet is annular.

The combustor of any preceding clause, wherein the common flow passage defines a mixing portion and an outlet portion, with the mixing portion adjacent the fuel outlet and the outlet portion adjacent the mixture outlet.

The combustor of any preceding clause, wherein the common flow passage defines a cross-sectional area that varies less than 20% within the mixing portion.

The combustor of any preceding clause, wherein the outer wall forms an acute angle with the center body.

The combustor of any preceding clause, wherein the outer wall and the center body form one of a converging cross-sectional area or a diverging cross-sectional area along a downstream direction through the outlet portion.

The combustor of any preceding clause, wherein the first compressed air flow passage comprises a first cross-sectional area, and the second compressed air flow passage comprises a second cross-sectional area different from the first cross-sectional area upstream of the intersection.

The combustor of any preceding clause, wherein the fuel outlet is fluidly coupled to the intersection.

The combustor of any preceding clause, wherein the fuel outlet is fluidly coupled to the first compressed air flow passage upstream of the intersection.

The combustor of any preceding clause, wherein the fuel outlet comprises a hollow sub-passage having a sub-passage outlet upstream of the intersection.

The combustor of any preceding clause, wherein the first compressed air flow passage defines a first angle with respect to the fuel supply passage and the second compressed air flow passage defines a second angle with respect to the fuel supply passage, with the first angle being different from the second angle.

The combustor of any preceding clause, wherein the first angle is larger than the second angle.

The combustor of any preceding clause, wherein the first compressed air flow passage comprises a first inlet and the second compressed air flow passage comprises a second inlet, with at least one of the first inlet or the second inlet oriented to provide compressed air along a direction that is one of parallel or perpendicular to the longitudinal direction.

The combustor of any preceding clause, wherein at least one of the first inlet or the second inlet are located in the outer wall.

A method of mixing fuel in a combustor of a turbine engine, the method comprising flowing a first compressed air flow, flowing a second compressed air flow, converging the first and second compressed air flows at an intersection to form a converged air flow, introducing fuel to at least one of the first compressed air flow, the second compressed air flow, or the converged air flow to form a mixture flow, and flowing at least the mixture flow to a mixture outlet of a fuel mixer of the combustor.

The method of any preceding clause wherein introducing fuel comprises introducing fuel to the converged air flow to form the mixture flow.

The method of any preceding clause wherein introducing fuel further comprises introducing fuel between the first compressed air flow and the second compressed air flow to form the mixture flow as a layered flow.

The method of any preceding clause, further comprising introducing fuel to the first compressed air flow upstream of the intersection to form the mixture flow, and converging the mixture flow with the second compressed air flow at the intersection to form a second mixture flow.

What is claimed is:

1. A turbine engine, comprising:
a compressor section, a combustion section, and a turbine section in serial flow arrangement, the combustion section having a combustor with a fuel mixer receiving a hydrogen fuel flow and comprising:
an outer wall in annular arrangement, defining a longitudinal direction, and having a mixture outlet;
a base member positioned partially forward of the outer wall, extending interior of the outer wall, having an annular outer wall and an annular inner wall, and defining a first compressed air flow passage between the annular outer wall of the base member and the outer wall, with the first compressed air flow passage receiving a first air flow;
the first compressed air flow passage having a first air inlet arranged on the outer wall and receiving a first air flow;
a second compressed air flow passage between the annular inner wall of the base member and a centerbody, the second compressed air flow passage having a second air inlet receiving a second air flow, and the second compressed air flow passage forming an intersection with the first compressed air flow passage;
the center body positioned interior of the first compressed air flow passage and the second compressed air flow passage;
a common flow passage extending from the intersection to the mixture outlet and at least partially defined by the center body; and
a fuel supply passage having a fuel outlet fluidly coupled to the intersection and arranged to inject the hydrogen fuel flow as a sandwiched layer between the first air flow and the second air flow.

2. The turbine engine of claim 1, wherein the fuel outlet is annular forming a complete annulus.

3. The turbine engine of claim 1, wherein the common flow passage defines a mixing portion having a converging cross-sectional area and an outlet portion having a constant cross-sectional area, with the mixing portion adjacent the fuel outlet and the outlet portion adjacent the mixture outlet.

4. The turbine engine of claim 3, wherein the common flow passage defines a cross-sectional area that varies less than 20% within the mixing portion.

5. The turbine engine of claim 3, wherein the mixing portion defines an axial mixing length and the outlet portion defines an axial output length, wherein the axial output length is between 10-40% of the axial mixing length.

6. The turbine engine of claim 3, wherein the outlet portion of the common flow passage defines a common flow passage height at the mixture outlet, and also defines an axial output length between the mixing portion and the mixture outlet, wherein the axial output length is between 0-25% of the common flow passage height.

7. The turbine engine of claim 1, wherein the first compressed air flow passage comprises a first cross-sectional area, and the second compressed air flow passage comprises a second cross-sectional area different from the first cross-sectional area upstream of the intersection.

8. The turbine engine of claim 1, wherein the fuel outlet comprises a hollow sub-passage having a sub-passage outlet upstream of the intersection.

9. The turbine engine of claim 1, wherein the first compressed air flow passage defines a first angle with respect to the fuel supply passage and the second compressed air flow passage defines a second angle with respect to the fuel supply passage, with the first angle being different from the second angle.

10. The turbine engine of claim 1, wherein at least one of the first air inlet or the second air inlet is oriented to provide compressed air along a direction that is one of parallel or perpendicular to the longitudinal direction.

11. The turbine engine of claim 10, wherein at least one of the first air inlet or the second air inlet are located in the outer wall.

12. The turbine engine of claim 1, wherein the common flow passage defines a common flow passage height, the mixture outlet defines an outlet diameter, and the center body defines a center body outer diameter, and wherein the common flow passage height is 50% of a difference between the outlet diameter and the center body outer diameter.

13. The turbine engine of claim 1, wherein the first air inlet is positioned between the outer wall and the base member positioned forward of the outer wall, and configured to provide the first air flow to the first compressed air flow passage.

14. A combustor for a turbine engine, comprising:
a combustor liner at least partially defining a combustion chamber; and
a fuel mixer receiving a hydrogen fuel flow and fluidly coupled to the combustion chamber, the fuel mixer comprising:
an outer wall defining a longitudinal direction and having a mixture outlet;
a base member positioned partially forward of the outer wall, extending interior of the outer wall, having an annular outer wall and an annular inner wall, and defining a first compressed air flow passage between the annular outer wall of the base member and the outer wall, with the first compressed air flow passage receiving a first air flow;
a first air inlet positioned between the outer wall and the base member, and configured to provide the first air flow to the first compressed air flow passage;
a second compressed air flow passage between the annular inner wall of the base member and a centerbody, the second compressed air flow passage having a second air inlet receiving a second air flow, and the second compressed air flow passage forming an intersection with the first compressed air flow passage;
the center body positioned interior of the first compressed air flow passage and the second compressed air flow passage;
a common flow passage extending from the intersection to the mixture outlet; and
a fuel supply passage having a fuel outlet fluidly coupled to the intersection and arranged to inject the hydrogen fuel flow as a sandwiched layer between the first air flow and the second air flow.

15. The combustor of claim 14, wherein the common flow passage defines a mixing portion and an outlet portion, with the mixing portion adjacent the fuel outlet and the outlet portion adjacent the mixture outlet, and wherein the common flow passage further defines a cross-sectional area that varies less than 20% within the mixing portion.

16. The combustor of claim 14, wherein the fuel outlet comprises a hollow sub-passage having a sub-passage outlet upstream of the intersection.

17. The turbine engine of claim 14, further comprising an annular body positioned between and spacing the first compressed air flow passage from the second compressed air flow passage, and wherein the annular body defines the first air inlet with the outer wall.

18. A method of mixing fuel in a combustor of a turbine engine, the method comprising:
flowing a first compressed air flow to a first compressed air flow passage positioned between an outer wall and a base member, the first compressed air flow passage receiving the first compressed air flow from a first air inlet positioned between the outer wall and the base member, wherein the base member is positioned partially forward of the outer wall, extending interior of the outer wall, having an annular outer wall and an annular inner wall, and defining the first compressed air flow passage between the annular outer wall of the base member and the outer wall;
flowing a second compressed air flow to a second compressed air flow passage; wherein the second compressed air flow passage is positioned between the annular inner wall of the base member and a centerbody, the second compressed air flow passage having a second air inlet receiving the second compressed air flow, and the center body is positioned interior of the first compressed air flow passage and the second compressed air flow passage;
converging the first compressed air flow and the second compressed air flow to meet at an intersection;
introducing an annular supply of hydrogen fuel between the first compressed air flow and the second compressed air flow at the intersection to form a mixture flow as a layered flow; and
flowing at least the mixture flow to a mixture outlet of a fuel mixer of the combustor.

* * * * *